(12) United States Patent
Beier et al.

(10) Patent No.: US 10,562,413 B2
(45) Date of Patent: Feb. 18, 2020

(54) SEAT RAIL DEVICE FOR VEHICLE SEAT

(71) Applicant: FAURECIA AUTOSITZE GMBH, Stadthagen (DE)

(72) Inventors: Rico Beier, Stadthagen (DE); Bertrand Touzet, Pollhagen (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 0 days.

(21) Appl. No.: 16/027,428

(22) Filed: Jul. 5, 2018

(65) Prior Publication Data
US 2019/0023155 A1 Jan. 24, 2019

(30) Foreign Application Priority Data
Jul. 21, 2017 (DE) .................... 20 2017 104 368 U

(51) Int. Cl.
*B60N 2/02* (2006.01)
*B60N 2/07* (2006.01)
*G01D 5/12* (2006.01)

(52) U.S. Cl.
CPC ......... *B60N 2/0244* (2013.01); *B60N 2/0722* (2013.01); *G01D 5/12* (2013.01); *B60N 2002/0272* (2013.01)

(58) Field of Classification Search
USPC ....................................................... 248/542
See application file for complete search history.

(56) References Cited

U.S. PATENT DOCUMENTS

| | | | | |
|---|---|---|---|---|
| 6,053,529 A * | 4/2000 | Frusti | .................... | B60N 2/002 248/429 |
| 6,683,544 B2 | 1/2004 | Tokunaga | | |
| 6,767,029 B2 | 7/2004 | Jaudouin | | |
| 6,798,196 B2 * | 9/2004 | Kojima | ................ | B60N 2/0224 324/207.26 |
| 6,851,655 B2 * | 2/2005 | Kume | .................. | B60N 2/0224 248/424 |
| 6,907,795 B2 * | 6/2005 | Barnabo | .............. | B60N 2/0224 73/862.69 |
| 6,935,692 B2 * | 8/2005 | Nishide | .................. | B60N 2/002 248/429 |
| 7,195,261 B2 * | 3/2007 | Yoshida | ................. | B60N 2/002 280/735 |

(Continued)

FOREIGN PATENT DOCUMENTS

DE 102013205497 10/2014
DE 102013213798 1/2015

(Continued)

OTHER PUBLICATIONS

Korean Office Action for Korean App. No. 20-2018-0002481 dated Jul. 30, 2019, including English translation, 18 pages.

*Primary Examiner* — Monica E Millner
(74) *Attorney, Agent, or Firm* — Barnes & Thornburg LLP

(57) ABSTRACT

A vehicle seat adapted for use in a vehicle includes a seat rail device arranged to extend between the vehicle seat and a vehicle to mount the vehicle seat to the vehicle. The seat rail device includes a lower rail coupled to the floor of the vehicle in a fixed position, an upper rail coupled to the vehicle seat and configured to be adjustable along a longitudinal axis relative to the lower rail, and a sensor device configured to detect a least one longitudinal position of the upper rail relative to the lower rail.

14 Claims, 1 Drawing Sheet

(56) References Cited

U.S. PATENT DOCUMENTS

| | | | | |
|---|---|---|---|---|
| 7,322,605 B2* | 1/2008 | Ventura | | B60N 2/06 280/735 |
| 7,330,008 B2* | 2/2008 | Lee | | B60N 2/06 318/466 |
| 7,439,735 B2* | 10/2008 | Barnabo | | B60N 2/06 324/207.2 |
| 7,511,479 B2* | 3/2009 | Schuler | | B60N 2/002 324/207.2 |
| 7,564,234 B2* | 7/2009 | Endoh | | B60N 2/0232 296/65.13 |
| 7,614,597 B2* | 11/2009 | Matsumoto | | B60N 2/0705 248/429 |
| 7,633,301 B2* | 12/2009 | Steenwyk | | B60N 2/002 324/457 |
| 7,812,600 B2* | 10/2010 | Ito | | B60N 2/0232 250/231.13 |
| 8,049,491 B2* | 11/2011 | Nishide | | B60N 2/06 324/207.22 |
| 8,806,936 B2 | 8/2014 | Suzuki | | |
| 8,810,240 B2* | 8/2014 | Nishide | | B60N 2/067 324/207.24 |
| 8,822,850 B2* | 9/2014 | Endo | | B60N 2/002 177/136 |
| 9,067,513 B2* | 6/2015 | Ozawa | | B60N 2/067 |
| 9,102,245 B2* | 8/2015 | Mischer | | B60N 2/0727 |
| 9,939,296 B2* | 4/2018 | Kitou | | G01D 11/30 |
| 10,011,192 B2 | 7/2018 | Bonk | | |
| 10,101,177 B2* | 10/2018 | Sato | | G01D 5/145 |
| 2016/0362077 A1* | 12/2016 | Lanter | | B60R 21/01 |
| 2017/0067761 A1 | 3/2017 | Kito | | |
| 2017/0096081 A1* | 4/2017 | Tsukamoto | | B60R 21/01554 |
| 2017/0261343 A1* | 9/2017 | Lanter | | G01D 5/147 |
| 2017/0368963 A1* | 12/2017 | Watanabe | | B60N 2/0881 |
| 2018/0334056 A1* | 11/2018 | Nagatani | | B60N 2/0244 |

FOREIGN PATENT DOCUMENTS

| | | |
|---|---|---|
| FR | 2888539 | 1/2007 |
| FR | 2926264 | 7/2009 |
| JP | 2002264701 A | 9/2002 |
| JP | 2004210167 A | 7/2004 |
| KR | 100816454 | 3/2008 |

\* cited by examiner

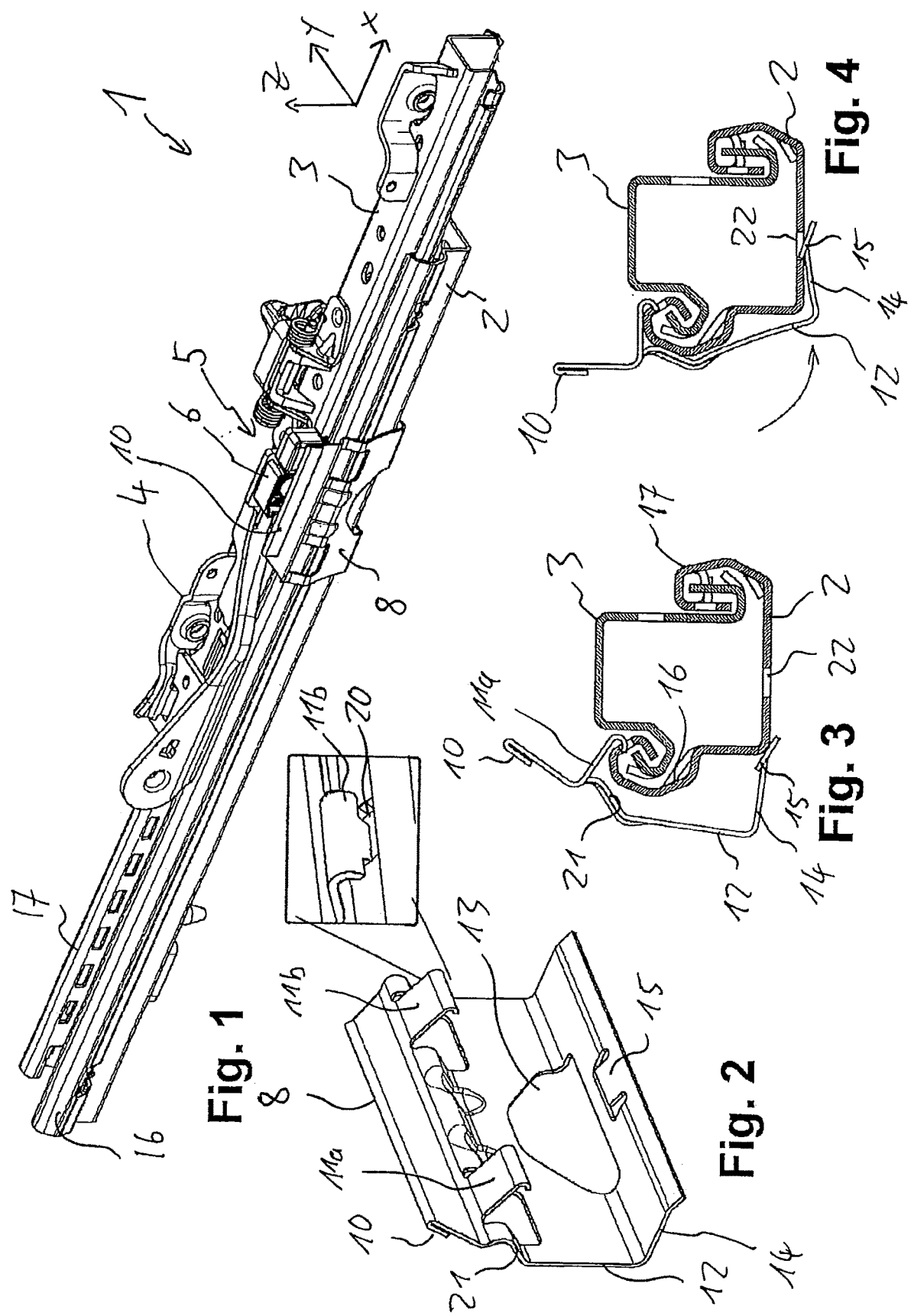

SEAT RAIL DEVICE FOR VEHICLE SEAT

PRIORITY CLAIM

This application claims priority under 35 U.S.C. § 119(b) to German Patent Application No. DE202017104368.1, filed Jul. 21, 2017, which is expressly incorporated by reference herein.

BACKGROUND

The present disclosure relates to seat rail devices, and particularly to seat rail devices adapted for use with vehicle seats. More particularly, the present disclosure relates to seat rail devices for controlling vehicle seats having sliding seat bottoms for use in vehicles.

SUMMARY

According to the present disclosure, a vehicle seat includes a seat rail device arranged to extend between the vehicle seat and a vehicle to mount the vehicle seat to the vehicle. The seat rail device includes a lower rail coupled to the floor of the vehicle in a fixed position and an upper rail coupled to the vehicle seat and configured to be adjustable along a longitudinal axis relative to the lower rail. The seat rail device further includes a sensor device configured to detect a least one longitudinal position of the upper rail relative to the lower rail.

In illustrative embodiments, the sensor device includes a sensor plate coupled to the outer side of the lower rail and a seat position sensor coupled to the upper rail and configured to move laterally in relation to the upper rail to detect the sensor plate.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a seat rail device in accordance with the present disclosure;

FIG. 2 is an enlarged view of the seat rail device of FIG. 1 with a hook engagement being shown as an enlarged detail;

FIG. 3 is a section view of the sear rail device shown in FIG. 1 in a first assembly step wherein the sensor plate is in the hooking-in position; and FIG. 4 is a similar view to FIG. 3 showing a second assembly step wherein the sensor plate is in the clipped-in position.

DETAILED DESCRIPTION

According to FIG. 1, a seat rail device 1 includes a lower rail 2 and an upper rail 3 is shown. The lower rail 1 is mounted to the vehicle in a fixed position relative to the vehicle. The upper rail 3 is received displaceably in the lower rail 1 to be adjustable along a longitudinal axis. The upper rail 3 is correspondingly provided for mounting a vehicle seat or seat frame. In some examples, two such seat rail devices are provided for one vehicle seat. The lower rail 2 and the upper rail 3 may be curved sheets and comprise slide bearings, generally in the form of ball cages or ball bearings, for sliding adjustment of the upper rail 3 in the lower rail 2. The ball bearings bearing cages are provided in the outer bearing regions 16 and 17 in which the lower rail 2 and the upper rail 3 engage behind each other in a form-fit manner. Moreover, a seat rail locking mechanism 4 is provided for locking the upper rail 3 in the lower rail 2 in the different longitudinal positions.

In addition, according to FIG. 1, the seat rail device 1 further includes a sensor device 5. The sensor device 5 configured to detect at least one longitudinal position or a longitudinal position range of the upper rail 3. This longitudinal position may be a forward most region of the upper rail 3, in which a deployment of the airbag or head airbag is not permitted. The deployment of the airbag or head airbag is not permitted because it could lead to a considerable endangerment of the person occupying the seat.

The sensor device 5 includes a seat position sensor 6 and a sensor plate 8. The seat position sensor 6 is coupled on the lockable upper rail 3. The sensor plate 8 is coupled to the outer side of the lower rail 2. The seat position sensor 6 is contacted electrically in a usual manner and designed as magnetic sensor or a hall sensor. The seat position sensor 6 runs lateral towards the outside, or perpendicular to the direction of longitudinal adjustment. The lateral direction of the seat position sensor 6 is also referred to as Y direction. The longitudinal direction to the lateral adjustment is also referred to as the X direction. The seat position sensor is mounted accordingly for detecting the sensor plate 8. In on example, the sensor plate 8 is made from a magnetically conductive material. The magnetically conductive material may be a magnetic steel, so that it influences a magnetic detection field of the seat position sensor 6 and can be detected by the seat position sensor 6. Thus, the seat position sensor 6 represents the active component and the sensor plate 8 the passive component of the sensor device 5.

The sensor plate 8 is shown in more detail in FIG. 2. The sensor plate 8 is made as one piece from a steel sheet and formed to include a detection area 10. The detection area 10 is detected by the seat position sensor 6. To that end the detection area 10 is configured to be double or in double layers so as to generate a stronger signal. Additionally, the detection area 10 may be made by flipping over the upper end of the sensor plate 8. In the mounted position according to FIG. 4, the detection area 10 runs perpendicular so that a sufficiently strong magnetic signal can be attained.

The sensor plate 8 includes an upper hook 11a and an upper hook 11b. The upper hooks 11a and 11b are formed by cutting and bending the starting metal sheet. The upper hooks 11a and 11b are spaced apart in the longitudinal direction or X direction respectively. The upper hooks 11a, 11b extend sideways or in the Y direction respectively and are open towards the bottom. The hooks 11a and 11b have a special shape which allows an exact X positioning and Y positioning. Additionally, the hooks 11a and 11b are graded in shape and thus able to penetrate into the lower rail 2 only up to a defined depth. Hereby, the outer shoulders are supported by the outer surface of the lower rail 2. This minimizes or avoids collision with the ball bearings.

In addition, according to FIG. 2, the sensor plate 8 includes an elastic deformation area 12 and a lower bending (lower bracket) 14. The elastic deformation area 12 and the lower bending 14 are configured to create the general shape of the two brackets or L shape of the sensor plate 8. The lower bending 14 includes a snap tab 15. The snap tab 15 is formed in the sensor plate and projects upwards. The snap tab 15 may again be formed by cutting and bending. The elastic deformation area 12 may be formed by a suitable gap or a central gap 13. The central gap 13 extends up into the lower bending 14. The central gap 13 is configured in this way to decrease in rigidity of the sensor plate 8 in in this area. The sensor plate 8 is formed more rigidly by means of the double layer detection area 10 and by means of suitable shapes including crimps or bend-over edges in areas towards the upper region with the hook 11a, 11b and the detection area 10.

In a first step according to FIG. 3, the sensor plate 8 is inserted by its hooks 11a, 11b into corresponding hook gaps 20 of the lower rail 2 which are provided, in a mounting area 16. The hook gaps 20 are formed in the lower rail 2 in a fitting manner corresponding to the pitch and the width of the hooks 11a, 11b. The hook gaps 20 formed in the lower rail 2 create an exact positioning in the direction X of the sensor plate 8.

After the hooks 11a, 11b have been hooked into the hook gaps 20 the sensor plate 8 is then pivoted. This pivot motion first happens without deformation of the sensor plate 8, until the lower bending 14 or, respectively, the snap tab 15 comes into contact with the lower rail 2, as shown in FIG. 3. Then the sensor plate 8 is pivoted further with elastic deformation in accordance with FIG. 4 whereby the snap tab 15 slides along the lower side of the upper rail 2 and the elastic deformation area 12 is bent open slightly. With this pivot motion a contact surface 21 of the sensor plate 8 comes to rest against the lower rail 2 guaranteeing a stable contact of the sensor plate 8 with the lower rail 2 preventing vibration of the detection area 10 and guaranteeing a good positioning in the Y direction. Upon further pivoting of the sensor plate 8 the snap tab 15 then reaches a snap cutout 22 in which is catches safely owing to the elastic tensioning.

In the second assembly step as shown in FIG. 4 the sensor plate 8 is locked to the lower rail 2 in a three-point lock catch with the two hooks 11a, 11b and the lower snap tab 15. Such three-point locking mechanisms are not only safe and stable but also sufficiently secured against tilting or rotational forces. Moreover, they allow unambiguous fixation in the directions X, Y, and Z (vertical direction) without tilting or tipping. The contact surface 21 of the sensor plate 8 continues to be in contact with the upper rail so that sufficient stability and vibration free mounting is provided. No further fastening means are provided.

In a mounting step, with hooking-in the sensor plate by its hooks 11a, 11b, a subsequent pivot motion can be executed quickly and securely because there may be no misplacement. The user may grab the sensor plate 8 by the detection area 10 and the lower deformation area 12 as well as the bending 14 and pivot is free until it locks in. A further advantage of the invention is that the sensor plate 8 can be mounted into the lower rail 2 independently or at a later stage respectively.

In one example, the seat rail device 1 may be configured for use on a vehicle seat. The seat rail device 1 may also be referred to as slide devices, and allow the longitudinal adjustment of a vehicle seat. The seat rail device 1 may include a lower rail to be mounted immovably on the vehicle and an upper rail mounted to be longitudinally adjustable in relation to the lower rail. The vehicle seat is mounted to the upper rail.

The seat rail device may further include a seat rail locking mechanism. The seat rail locking mechanism is configured to adjust and set the upper rail to different longitudinal positions. The longitudinal adjustment may be executed by means of an electric drive or manually. In the case of such seat rail devices a forward most position of the vehicle seat and thereby of the upper rail must be detected in order to block the release of a frontal airbag or head airbag.

In another example, the lower rail and the upper rail of the seat rail device may include a sensor device. The sensor device is mounted on the lower rail and the upper rail by means of which the relative position of the two rails in relation to each other can be detected.

The sensor device may include a sheet sensor and a contact electrode. The sheet sensor having a resistive element. The sheet sensor and the contact electrode are configured to be in contact so that different longitudinal positions may be electrically detected.

In another example, the sensor device further includes a seat position sensor and a sensor plate. The seat position sensor is mounted on the upper rail. The sensor plate is mounted on the lower rail and configured to be detected by the seat position sensor. The sensor plate is held on the lower rail in an interlocking and/or force-fitting manner. In one example, the sensor plate is snapped in or clipped in on the lower rail. The sensor plate may also be mounted by means of elastic deformation and no additional fixation means are provided for mounting on the lower rail.

In another example, the sensor plate may be attached directly to the lower rail without any further components. Thus, the assembly is cost-effective without a higher number of components. The seat position sensor is mounted onto the upper rail and a one-piece sensor plate to be snapped in directly onto the lower rail. This allows quick and secure assembly in few mounting steps.

In another example, the sensor plate may be mounted onto the lower rail from the outside to allow a particularly simple assembly. The sensor plate is configured as such not to project into the interior of the lower rail so that even the adjustment path of the upper rail in the lower rail is not compromised.

In another example, the seat position sensor is a magnetic sensor. The seat position sensor is configured to detect the immediate presence of proximity of a detection area of the sensor plate made of a magnetically conductive material. The magnetically conductive material may be magnetic steel or iron. As such, a contactless detection is possible leading to no wear on the sensor device.

In another example, the seat position sensor may be a hall sensor or another magnetic sensor. The seat position sensor is contacted by the vehicle seat. Because in the vehicle seats no further adjustment means are provided anyway, again, no relevant additional expenditure is required. An electrical contact of the sensor plate firmly affixed to the lower rail in not required.

The sensor plate may be further configured to include an upper detection area projecting next to the adjustment path of the seat position sensor. In order to create a sufficiently strong magnetic signal the detection area may be doubled by flipping over one end of the sensor plate to generate a strong signal even while using an elastic, thinly designed sensor plate.

In another example, the mounting of the sensor plate preferably happens by means of at least one hook. The sensor plate could also be mounted using two hook spaced apart in the longitudinal direction engaging into corresponding hook receptacles of the lower rail. These hook receptacles may be formed in a mounting area of the lower rail. Engagement of the hooks into the hook receptacle may be achieved by means of a simple assembly movement and guarantees a precise longitudinal positioning. The sensor plate pivots about the inserted hooks in such a way that a contact surface of the sensor plate comes to rest against an outer surface of the lower rail thereby enabling a secure, rattle free and firm contact of the sensor plate in its upper region next to the detection area. The sensor plate may be further pivoted by means of a lower, elastic deformation area on which a lower snap-in device is formed which can snap into a snap receptacle of the lower rail. The lower snap-in device may be a snap tab. The snap-in device on the bottom side of the lower rail may slide, while the deformation area is elastically deformed, until it reaches the snap receptacle.

The sensor plate is configured to allow a simple and secure assembly procedure with exact positioning and firm, rattle free fixation. The assembly procedure may happen by hooking up with subsequent pivot motion attaining safe snap in and contact.

In another example, the two upper hooks and the lower snap-in device create a three point linkage or three point engagement. The three point linkage is configured to be stable and secure and guarantees exact positions in the directions X, and Y as well as Z.

The elastic deformation area may be formed by means of a suitable recess of the sensor plate. The upper stiff region may be configured to be sufficiently rigid by means of corresponding crimps or shapes and contain the contact surface. The sensor plate may be L shaped and brought into contact with the lateral and lower region of the lower rail and snapped in there.

The sensor plate forms a direct, secure attachment to the lower rail. The direct attachment may be created from a starting plate or a semi by means of a single deformation step, where corresponding recesses are cut out.

The invention claimed is:

1. A seat rail device for a vehicle seat comprising
a lower rail mounted on the vehicle in a fixed position relative to the vehicle,
an upper rail configured to be adjustable along a longitudinal axis on the lower rail,
a sensor device configured to measure a longitudinal position of the upper rail in relation to the lower rail,
wherein the sensor device includes a sensor plate mounted to the lower rail and a seat position sensor mounted to the upper rail and configured to detect the sensor plate,
wherein the sensor plate is mounted to an outside of the lower rail in an interlocking and/or force-fitting manner, and
wherein the sensor plate includes an upper hook configured to hook into a hook receptacle formed in the lower rail and a snap tab configured to lock the sensor plate in a fixed position by snapping into a snap receptacle formed in the lower rail.

2. The seat rail device of claim 1, wherein the sensor plate is mounted to the lower rail without any further fastening means.

3. The seat rail device of claim 1, wherein the sensor plate configured to be elastic and mounted to the lower rail by means of elastic deformation.

4. The seat rail device of claim 1, wherein the sensor plate is formed from a metal sheet made of spring steel.

5. The seat rail device of claim 4, wherein the sensor plate is formed and cut from one single starting sheet.

6. The seat rail device of claim 1, wherein the seat position sensor is a magnetic sensor and the sensor plate is formed from a magnetic material such as steel or iron.

7. A seat rail device for a vehicle seat comprising
a lower rail mounted on the vehicle in a fixed position relative to the vehicle,
an upper rail configured to be adjustable along a longitudinal axis on the lower rail,
a sensor device configured to measure a longitudinal position of the upper rail in relation to the lower rail,
wherein the sensor device includes a sensor plate mounted to the lower rail and a seat position sensor mounted to the upper rail and configured to detect the sensor plate,
wherein the sensor plate is mounted to an outside of the lower rail in an interlocking and/or force-fitting manner, and
wherein the sensor plate includes two upper hooks configured to hook into hook receptacles formed in the lower rail and a snap tab configured to lock the sensor plate in a fixed position by snapping into a snap receptacle formed in the lower rail.

8. The seat rail device of claim 7, wherein a longitudinal position of the sensor plate along the lower rail is defined by a least one hook and the sensor plate pivots about the hooks after the hooks are inserted.

9. The seat rail device of claim 1, wherein the snap tab includes a surface slip on the bottom side of the lower rail configured to pivot the sensor plate into arrangement to allow the snap tab to snap into the snap receptacle.

10. A seat rail device for a vehicle seat comprising
a lower rail mounted on the vehicle in a fixed position relative to the vehicle,
an upper rail configured to be adjustable along a longitudinal axis on the lower rail,
a sensor device configured to measure a longitudinal position of the upper rail in relation to the lower rail,
wherein the sensor device includes a sensor plate mounted to the lower rail and a seat position sensor mounted to the upper rail and configured to detect the sensor plate,
wherein the sensor plate is mounted to an outside of the lower rail in an interlocking and/or force-fitting manner, and
wherein the sensor plate is mounted in a three form-fit means including a pair of hooks configured to mount into receptacles formed in an upper end of the lower rail and a snap tab configured to mount into a snap receptacle formed in a lower end of the lower rail to form a three-point locking connection including the pair of hooks and the snap tab.

11. The seat rail device of claim 1, wherein the sensor plate further includes a bending formed in an L shape.

12. The seat rail device of claim 1, wherein the sensor plate further includes a detection area arranged to project upwards and a seat position sensor arranged in a direction of detection Y for detecting the detection area.

13. The seat rail device of claim 12, wherein the sensor plate is arranged in an upper area in a rigid position in a spaced apart relation to the detection area and further includes a lower elastic deformation area formed to include a recess allowing higher flexibility or elasticity.

14. The seat rail device of claim 1, wherein the sensor plate is arranged to not protrude past the interior of the lower rail.

* * * * *